(12) United States Patent
Botterweck

(10) Patent No.: US 8,698,090 B2
(45) Date of Patent: Apr. 15, 2014

(54) PRACTICAL SPECT CALIBRATION METHOD FOR QUANTIFICATION OF NUCLIDES WITH HIGH-ENERGY CONTRIBUTIONS

(75) Inventor: Henrik Botterweck, Lubeck (DE)

(73) Assignee: Koninklijke Philips N.V., Eindhoven (NL)

( * ) Notice: Subject to any disclaimer, the term of this patent is extended or adjusted under 35 U.S.C. 154(b) by 350 days.

(21) Appl. No.: 13/120,662

(22) PCT Filed: Oct. 5, 2009

(86) PCT No.: PCT/IB2009/054352
§ 371 (c)(1),
(2), (4) Date: Mar. 24, 2011

(87) PCT Pub. No.: WO2010/041192
PCT Pub. Date: Apr. 15, 2010

(65) Prior Publication Data
US 2011/0174963 A1    Jul. 21, 2011

Related U.S. Application Data

(60) Provisional application No. 61/104,307, filed on Oct. 10, 2008.

(51) Int. Cl.
*G01D 18/00* (2006.01)
*H01L 27/146* (2006.01)
*G06F 7/60* (2006.01)

(52) U.S. Cl.
USPC .................. 250/370.09; 250/252.1; 703/2

(58) Field of Classification Search
USPC .................. 250/370.09, 252.1; 703/2
See application file for complete search history.

(56) References Cited

U.S. PATENT DOCUMENTS

| 5,821,541 A | * | 10/1998 | Tumer | 250/370.09 |
| 7,602,989 B2 | * | 10/2009 | Biggs et al. | 382/260 |
| 2009/0154641 A1 | * | 6/2009 | Thielemans | 378/21 |

FOREIGN PATENT DOCUMENTS

WO    WO 2006054192 A1 *  5/2006

* cited by examiner

*Primary Examiner* — David Porta
*Assistant Examiner* — Kenneth J Malkowski

(57) ABSTRACT

When calibrating a nuclear camera, such as a SPECT camera, point spread functions (PSF) are simulated for all possible photon energies and detection distances that the camera may experience. During manufacturer-side calibration, a point source (14) is imaged by the nuclear camera and a PSF therefor is measured. The measured PSF is compared to one or more simulated PSFs and a difference therebetween is determined. To calibrate the measured PSF, simulated PSF data is interpolated into the measured PSF to minimize the difference between the measured and simulated PSFs. The calibrated PSF is stored to memory and accessed during user-side calibration. A user then images a tracer sample during a routine camera calibration, and a PSF for the tracer sample is compared to the calibrated PSF to determine a level of contamination in the tracer sample. The tracer sample PSF is then calibrated for use in reconstructing nuclear images.

20 Claims, 5 Drawing Sheets

US 8,698,090 B2

PRACTICAL SPECT CALIBRATION METHOD FOR QUANTIFICATION OF NUCLIDES WITH HIGH-ENERGY CONTRIBUTIONS

CROSS REFERENCE TO RELATED APPLICATIONS

This application claims the benefit of U.S. provisional application Ser. No. 61/104,307 filed Oct. 10, 2008, which is incorporated herein by reference.

The present innovation finds particular application in anatomic imaging systems, particularly involving single photon emission computed tomography (SPECT) imaging, but may also find application in other nuclear imaging systems and the like. However, it will be appreciated that the described technique may also find application in other imaging systems, other imaging scenarios, other image analysis techniques, and the like.

There are many radioactive isotopes used for SPECT applications, especially in oncology, where absolute quantification and scatter correction is inhibited by contributions from higher-energy photons (300 keV and above). These stem either from isotope contaminations (e.g. Tl-201 with Tl-200 and Tl-202) or inherent nucleic transitions (e.g. I-123). In the former case the grade of contamination varies with time (differing half-life lengths) and tracer sample and can only be estimated for a concrete acquisition. The percentage of high-energy photons may be low, but many will pass the collimator by septum penetration. Backscatter, e.g. at the camera shielding, will then lead to a significant diffuse low-energy background in projections. This is a severe problem for all situations where absolute quantification and/or down-scatter estimation is relevant, such as oncology applications or simultaneous multiple nuclide reconstruction.

Quantitative SPECT suffers from several image degrading factors. Scatter and attenuation within the patient are taken into account by advanced reconstruction methods using, e.g., iterative Monte-Carlo (MC) estimations of the imaging process.

However, for some isotopes there are high energy photons (e.g. 783 keV for I-123) leading to background noise by collimator penetration and back-scatter, which can be as large as the signal itself. See, e.g., Y. Du, B. M. W. Tsui and E. C. Frey, "Model-based crosstalk compensation for simultaneous Tc99 m/I123 dual-isotope brain SPECT imaging," Med. Phys. 34, September 2007, which describes using Monte Carlo-estimated point-spread functions (collimator-detector response functions) to estimate these high-energy contributions.

The present application provides new and improved systems and methods for pre-calibrating point spread functions for nuclides imaged by a nuclear camera at a manufacturer's site and simplifying routine calibration at a user's site, which overcome the above-referenced problems and others.

In accordance with one aspect, a nuclear camera calibration system includes a nuclear camera, such as a single photon emission computed tomography (SPECT) camera or a positron emission tomography (PET) camera, which images a radiopharmaceutical point source at least one of a manufacturer's site and a user's site. The system further includes processor that compares a measured point spread function (PSF) from a point source image to a simulated PSF to determine a difference value therebetween, and generates a PSF correction curve by interpolating PSF data for the measured PSF to reduce the difference value using the simulated PSF. Additionally, the processor calibrates the measured PSF to generate a calibrated PSF, and stores the calibrated PSF to a memory.

According to another aspect, a method of pre-calibrating a point spread function (PSF) for a nuclear camera includes generating simulated PSFs for all photon energies at all detection distances relative to the surface of the nuclear camera, measuring a PSF of each of at least one radiopharmaceutical potentially employed by a user, and comparing the measured PSF to a corresponding simulated PSF for the at least one nuclide to determine a difference value therebetween. The method further includes calibrating the measured PSF using simulated PSF values to reduce the difference value between the measured PSF and the simulated PSF, and storing the calibrated PSF to memory.

According to another aspect, a method of re-calibrating manufacturer-calibrated point spread functions (PSF) for a nuclear camera at a user site includes scanning a tracer sample using the nuclear camera, generating a nuclear image of the tracer sample from acquired nuclear scan data, and comparing a measured PSF from the nuclear image to a manufacturer-calibrated PSF. The method further includes adjusting one or more calibration parameters to estimate a level of contamination in the tracer sample, employing the adjusted parameters when combining the manufacturer-calibrated PSF and a simulated PSF for the tracer sample, estimating weighting factors for the PSF, and recalibrating the measured PSF using the weighting factors to generate a recalibrated PSF.

According to another aspect, a method of calibrating a point spread function for a nuclear camera includes pre-calculating a PSF for a selected isotope, scanning a point source comprising a sample of the selected isotope to be used as a tracer in a nuclear scan of a subject, and generating a calibrated PSF for the selected isotope based on a measured PSF for point source and the pre-calculated PSF for the selected isotope.

One advantage is that laborious PSF calibration is shifted from the user to the manufacture.

Another advantage resides in reducing a number of calibration steps required of the user.

Still further advantages of the subject innovation will be appreciated by those of ordinary skill in the art upon reading and understand the following detailed description.

The innovation may take form in various components and arrangements of components, and in various steps and arrangements of steps. The drawings are only for purposes of illustrating various aspects and are not to be construed as limiting the invention.

FIG. 1 illustrates a system 10 that facilitates calibrating a point spread function for a nuclear camera or detector 12 quickly and efficiently in situ at a hospital or other healthcare-providing location. A point spread function (PSF) describes the response of an imaging system to a point source. The PSF is the spatial domain version of the modulation transfer function. In contrast to classical approaches in which nuclear camera point spread functions are fixed while other parameters are calibrated around it, the illustrated system permits calibration of the point spread function itself. In one embodiment, the camera is a SPECT camera. In other embodiments, the camera is a positron emission tomography (PET) camera and the system 10 is employed in a PET scanner.

Figure 1:
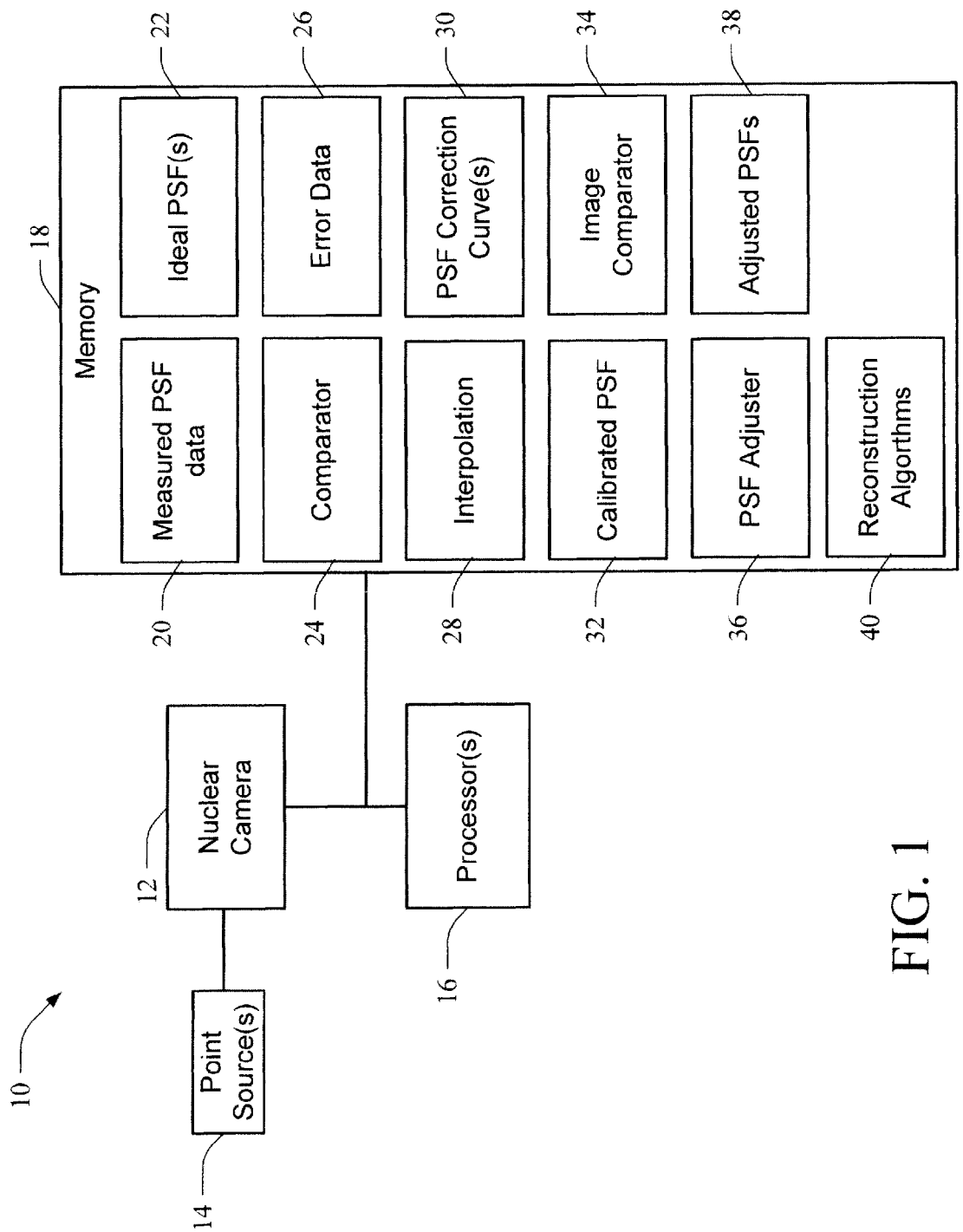
FIG. 1 illustrates a system that facilitates calibrating a point spread function for a nuclear camera or detector quickly and efficiently in situ at a hospital or other healthcare providing location.

The system 10 includes the nuclear camera 12, which receives transmission data from one or more radioactive point sources 14 (e.g., a radiopharmaceutical, radioactive tracer, etc.) for initial calibration at the manufacturer's site. The system additionally includes one or more processors 16 that execute computer-executable instructions for carrying out various acts or functions described herein. The computer-executable instructions are stored to a memory 18, along with data that is pre-generated, measured, analyzed, manipulated, etc., to provide the herein-described functionality.

At the manufacturer's site, the processor 16 measures point spread function data 20 detected by the nuclear camera 12 from the point source 14. The measured PSF function is compared to a pre-generated ideal PSF for the specific point source nuclide being used. The processor executes a comparison algorithm 24 to determine a difference between the measured PSF and the ideal PSF. For instance, the ideal PSF can be subtracted from the measured PSF to determine a difference or error 26 in the ideal PSF model. The processor then executes an interpolation algorithm 28 to interpolate and smooth the offset or error to generate a PSF correction curve. The processor employs the correction curve(s) to generate one or more calibrated PSFs 32.

At the user's site (e.g., once a nuclear scanner comprising the system 10 has been delivered to a hospital or the like), a point source 14 that is used for a daily energy calibration is also used to empirically measure the PSF of the nuclear camera 12. The processor executes an image comparison algorithm 34 to compare a point spread function derived from image data generated from the user's calibration point source. By comparing the manufacturer's calibrated PSF 32 and the measured PSF 20 (e.g., as measured at the user's site) determined by the image comparator 34, the difference or offset between the calibrated PSF and the measured PSF is again determined. The processor then executes a PSF adjuster 36 to generate adjusted PSFs 38 from the measured PSF and the offset. These recalibrated or adjusted PSFs are then used for image reconstruction 40.

In another embodiment, for dual isotope examinations, different attenuation shields are used and a separate offset curve is generated for each function. In this manner, PSFs for each isotope are generated, calibrated, and employed during reconstruction of nuclear images when two tracers are employed to image a patient.

According to one example, a camera manufacturer delivers pre-calibrated PSFs for both standard and high-energy down-scatter contributions. The pre-calibrated PSFs can include PSFs that account for all camera parameters, such as collimators, shields, point sources, etc. In the daily routine calibration at the user site (e.g., a hospital or the like) a sample of the employed tracer(s) (e.g., a radiopharmaceutical or the like) is used as point source. An optimization criterion is used to estimate the actual high-energy or off-energy contamination (e.g., energy not attributable to the tracer sample) from the tracer sample, as well as to estimate a fit to the actual point-spread function that is used in resolution-recovered reconstruction with scatter correction. In this manner, the PSF is customized to the actual tracer employed. In one embodiment, the PSF measured from the scan of the tracer sample is adjusted in real time during the scan.

In another embodiment, the system is used in a similar manner to correct for fluorescence collimator scatter.

Figure 2:
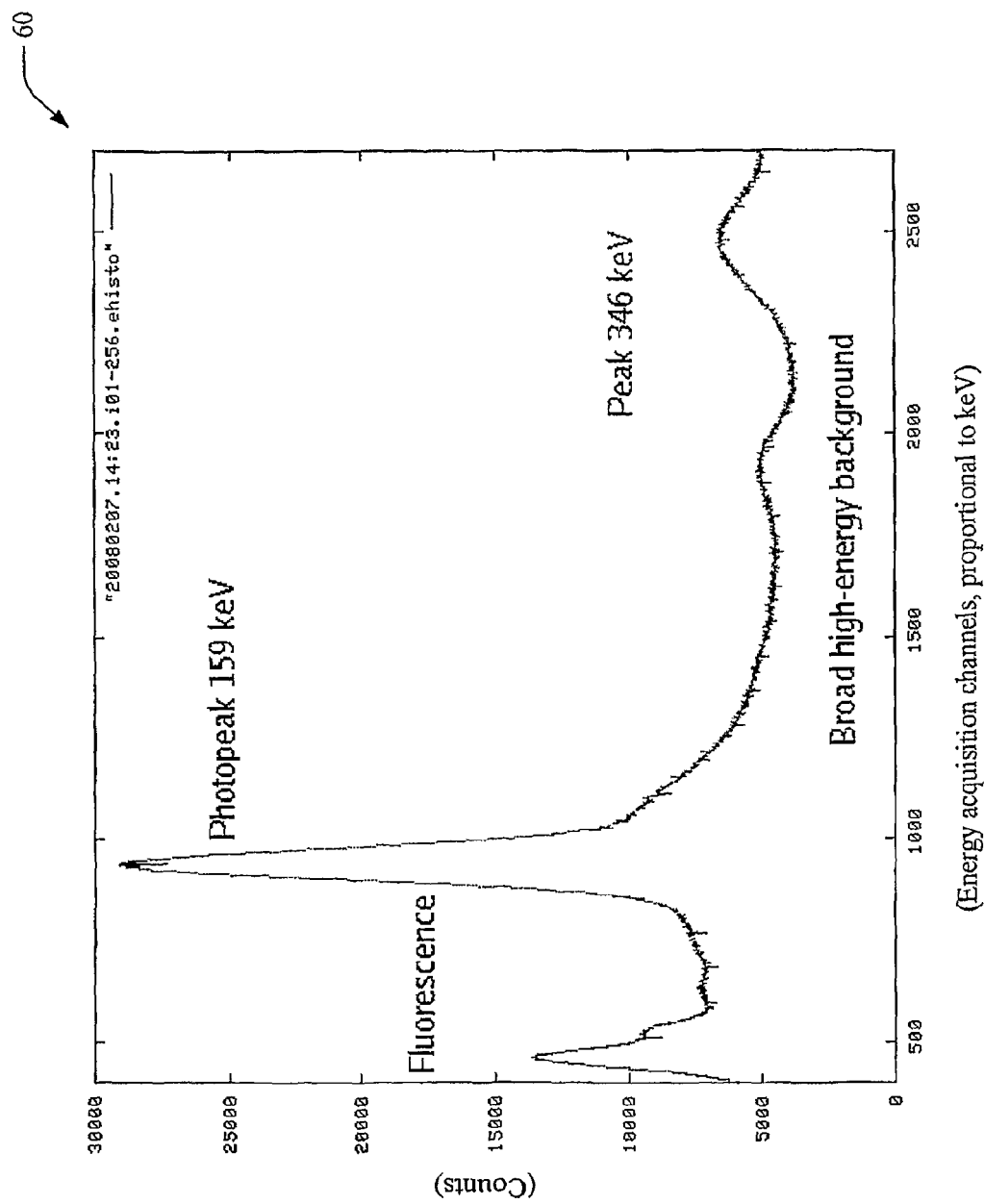
FIG. 2 illustrates an energy spectrum for a scatter-free point source positioned in front of a collimator and a nuclear camera in a nuclear scanner operating in list mode.

FIG. 2 illustrates an energy spectrum 60 for a scatter-free point source positioned in front of a collimator and a nuclear camera in a nuclear scanner operating in list mode. Counts (e.g., detected photons) are shown on the ordinate, and energy acquisition channels, proportional to keV, are shown on the abscissa. Most of the detected photons, even at the main photo-peak at 159 keV, are from high-energy contributions (e.g., down-scattered in the camera). The system 10 (FIG. 1) accounts for this phenomenon to permit quantitative reconstruction. That is, the high-energy photons are distributed spatially differently, and cannot be corrected by classical "calibration factors." Accordingly, the system 10 calibrates the PSF itself to account for the high-energy contributions of the detected photons.

Figure 3:
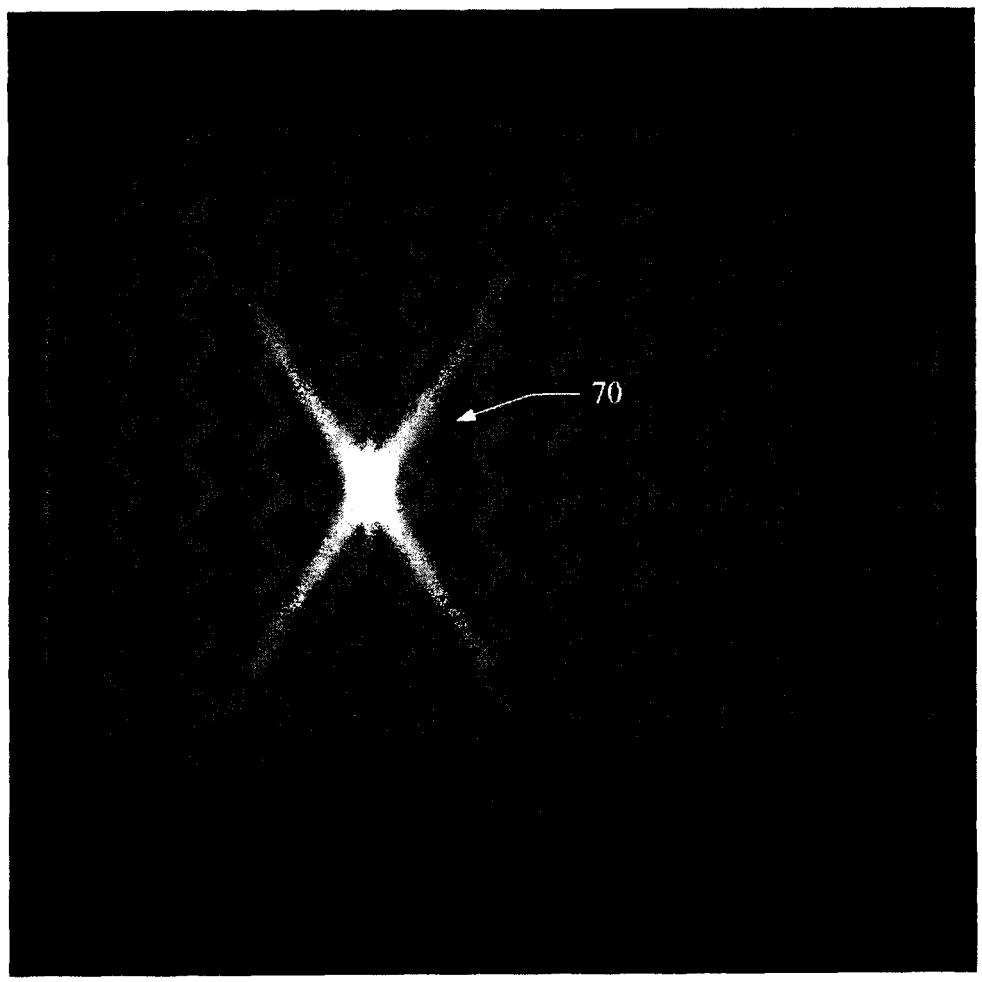
FIG. 3 illustrates a typical PSF for Iodine-123, energy window 150-175 keV, list-mode acquisition with pre-selected collimator and enhanced contrast to permit visualization of the diffuse background.

FIG. 3 illustrates a typical PSF for Iodine-123, energy window 150-175 keV, list-mode acquisition with pre-selected collimator and enhanced contrast to permit visualization of the diffuse background. The 4-ray star 70 shows that the collimator is hexagonal and built by folding lead plates.

Figure 4:
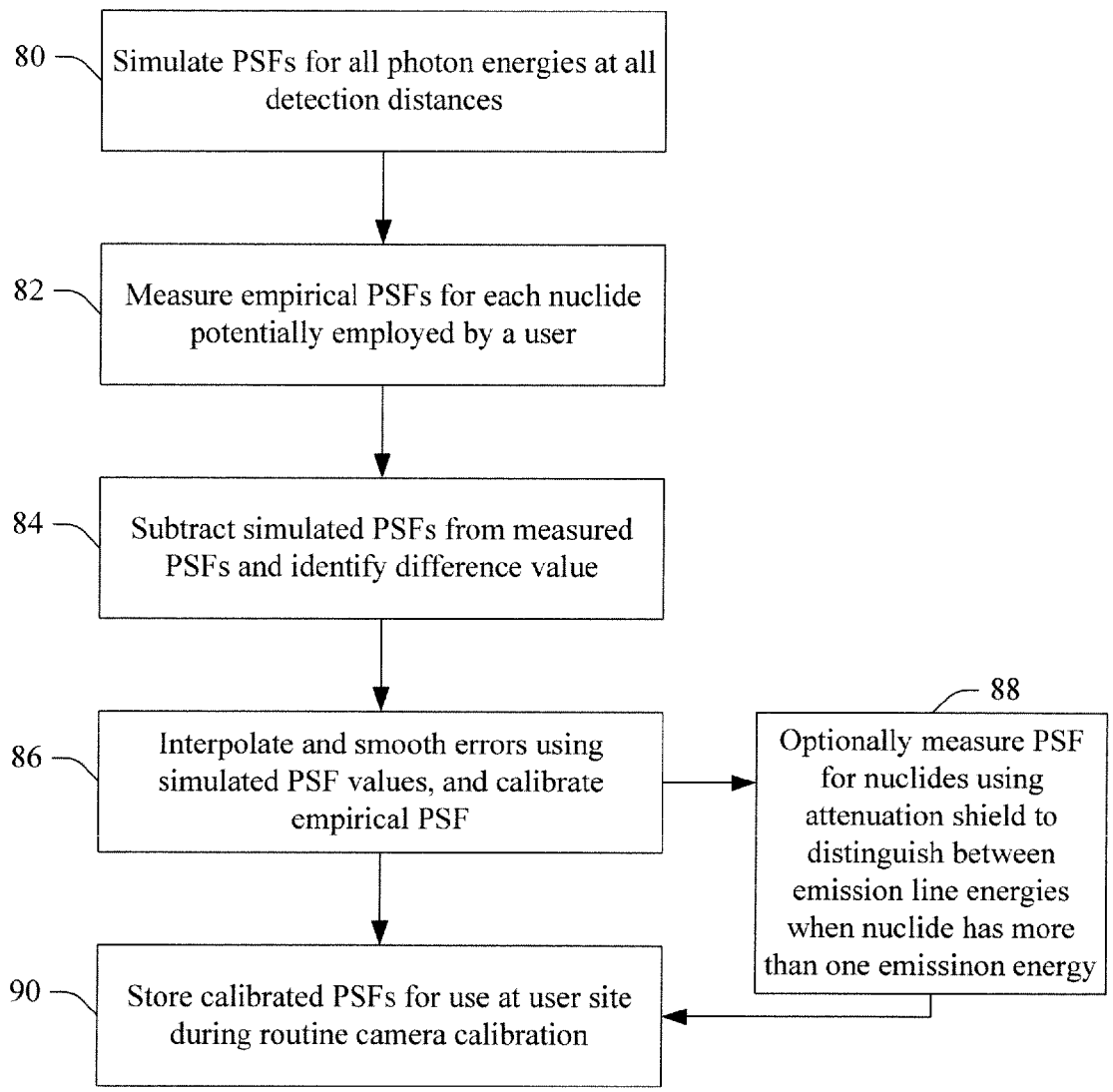
FIG. 4 illustrates a method of calibrating a PSF for a nuclear camera at a manufacturer's site.
Figure 5:
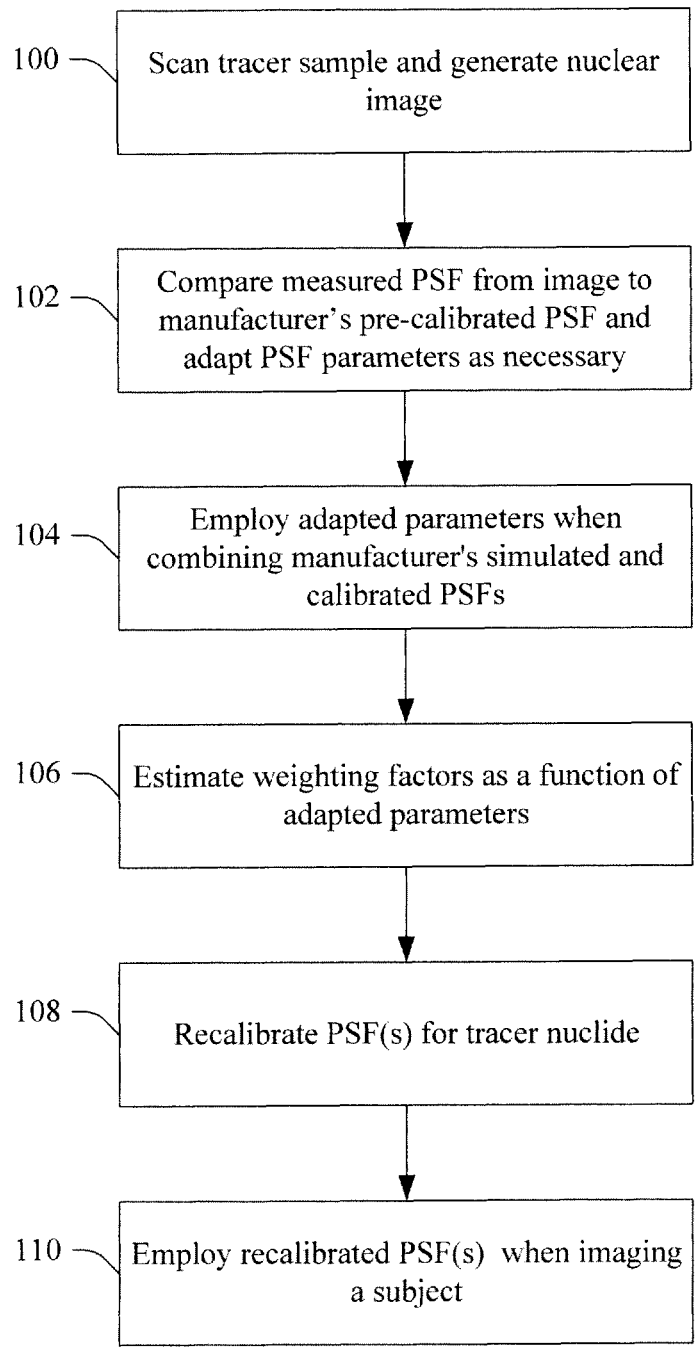
FIG. 5 illustrates a method of re-calibrating or adjusting manufacturer-calibrated PSFs at a user's site, in accordance with one or more aspects described herein.

FIGS. 4 and 5 illustrate a method for correcting for high-energy contaminations in clinical practice. Whereas a-priori determined correction data (e.g., performed at the manufacturer's site) may be complex, the effort spent in daily calibration (e.g., at the users site) is minimized. Accordingly, the method comprises two parts. First, the camera manufacturer delivers pre-calculated point-spread-functions for both standard and high-energy down-scatter contributions (FIG. 4). In the daily routine calibration at the user's site (FIG. 5), a sample of the employed tracer is used as point source. An optimization criterion is used to estimate from this point source the actual high-energy contamination caused thereby, and a fit to the real (measured) point-spread function used in resolution-recovered reconstruction with scatter correction when reconstructing an image. Thus, there is not just a calibration "factor" connecting camera images and quantitative reconstructions, but rather the camera response to incoming photons is corrected with spatial and energetic resolution. This is done robustly by employing a priori knowledge from previous (e.g., Monte-Carlo) calculations and adapting one or more remaining weight factors during calibration.

FIG. 4 illustrates a method of calibrating a PSF for a nuclear camera at a manufacturer's site. At 80, PSFs for all photon energies and distances are generated. For instance, image generation in the nuclear camera is modeled as realistically as possible to account for variables such as septum penetration, collimator scattering, and k-edge fluorescence in lead. Monte-Carlo simulation of these variables is performed and the point-spread-functions for all energies and distances are constructed. In one embodiment, the foregoing is performed using a "Punctum" collimator simulator.

At 82, empirical PSFs for point sources of all nuclides (e.g., tracers) that may be employed at the user's site to image a subject or patient are acquired. For instance, down-scatter images (e.g., the Tl-window at 70 keV for Tc sources, etc.) are measured initially, and then again after passing several half lives of the contaminating isotopes to detect the time-dependent effects thereof. List-mode acquisitions facilitate obtaining data independent of special energy-window and resolution settings using, e.g., a Philips Skylight nuclear scanner or the like.

At 84, the simulated PSF is subtracted from the empirical PSF. The difference reflects all modeling errors, including high-energy contamination, backscatter, and non-linear camera response.

At 86, the differences (e.g., the errors) are interpolated and smoothed to energies and distances that have not been measured (e.g., using simulated or modeled values) to calibrate the empirical PSF. The interpolation is done linearly with regard to space and energy, with the exception of energy discontinuities at fluorescence edges.

At 88, if the isotope (e.g., the point source) under consideration has two or more emission energies, the PSF is further measured while including attenuating shields (e.g., water, lead) in order to differentiate between the contributions from the respective emission line energies to determine whether detected low-energy photons stem from low-energy emissions or high-energy photons that are down-scattered only in the camera (e.g., when employing the shielding). This permits the estimation of PSFs both on emission and detection energy.

At 90, a calibrated PSF for the nuclide is generated and stored to memory using the smoothed PSF generated at 86 and/or using the PSF estimation data generated at 88. The method is performed iteratively until calibrated PSFs have been generated for all nuclides that may be employed at the user's site.

FIG. 5 illustrates a method of re-calibrating or adjusting manufacturer-calibrated PSFs at a user's site, in accordance with one or more aspects described herein. At 100, a short-time acquisition scan of a tracer sample is performed to generate raw nuclear image data that is reconstructed into a nuclear image of the tracer. At 102, the acquired image (e.g., a PSF therefor) is compared with the pre-calibrated PSFs from the manufacturer. Additionally, a few calibration parameters may be adapted to estimate the grade of contamination of the isotope sample.

At 104, the adapted parameters are employed to combine the ideal (e.g., simulation-modeled) PSFs and the difference-PSFs (e.g., generated at 86 of FIG. 4) provided by the manufacturer. At 106, weighting factors are estimated based on parameters such as the overall norm of the PSF, mean squared error, and central peak size. At 108, the PSFs are recalibrated and stored. At 110, the recalibrated PSFs are used in the forward- and back-projection steps of iterative reconstruction of a nuclear image after scanning a subject or patient. That is, the subject or patient is prepared and placed in the nuclear scanner. The patient is injected with the tracer that was used in the routine calibration and a diagnostic image is generated. Optionally, the scanner may be recalibrated during the day, e.g., if a different batch of the tracer is used.

In one embodiment, the methods of FIGS. 4 and 5 are employed to detect and adjust for lead fluorescence contribution, in cases where such contributions are not being initially taken into account by the simulated PSF model. In this case it is important to estimate intermediate energy photons (scatter at energies between the detection window and the emission energy) during reconstruction and to have fluorescence contributions for the intermediate energy photons. Accordingly, the manufacturer measures the fluorescence contributions for special energies, and other photon energies are interpolated after subtracting the modeled PSF.

In another embodiment, the described systems and methods are used when performing quantitative SPECT reconstruction for nuclides such as Th-201 or I-123, especially in oncology. In another embodiment, the described systems and methods are used in SDI (simultaneous multiple nuclide) SPECT imaging when there is a desire for correcting down-scatter estimation.

In yet another embodiment, the described systems and methods are employed in multi-modal imaging systems (e.g., combined SPECT/CT), Vantage™ systems (e.g., CardioMD), using attenuation information. In another embodiment, the described systems and methods are employed and/or executed at workstations for SPECT reconstruction.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A nuclear camera calibration system, including:
   a nuclear camera that images a radiopharmaceutical point source and scans a radiopharmaceutical tracer sample; and
   a processor that:
   generates a nuclear image of a point source of the radiopharmaceutical tracer sample from acquired nuclear scan data;
   compares a measured PSF from the nuclear image to the calibrated PSF;
   compares a measured point spread function (PSF) from a point source image to a simulated PSF to determine a difference value therebetween;
   generates a PSF correction curve by interpolating PSF data for the measured PSF to reduce the difference value using the simulated PSF;
   calibrates the measured PSF to generate a calibrated PSF;
   stores the calibrated PSF to a memory;
   adjusts one or more calibration parameters to estimate a level of off-energy contamination in the tracer sample;
   employing the adjusted parameters, combines the calibrated PSF and a simulated PSF for the radiopharmaceutical tracer sample;
   estimates weighting factors for the calibrated PSF; and
   at least one of recalibrates the calibrated PSF and calibrates the measured PSF using the weighting factors.

2. The system according to claim 1, wherein the nuclear camera is one of a single photon emission computed tomography (SPECT) camera or a positron emission tomography (PET) camera.

3. The system according to claim 1, wherein the processor generates at least one calibrated PSF for each of a plurality of radiopharmaceuticals that are used by a user of the nuclear camera.

4. The system according to claim 1, wherein the processor generates a plurality of simulated PSFs for a plurality of permutations of photon energies and detection distances that can occur when imaging each of a plurality of radiopharmaceuticals using the nuclear camera.

5. A method of pre-calibrating a point spread function (PSF) for a nuclear camera, including:
   generating simulated PSFs for all photon energies at all detection distances relative to the surface of the nuclear camera;
   measuring a PSF of each of at least one radiopharmaceutical potentially employed by a user;
   comparing the measured PSF to a corresponding simulated PSF for the at least one nuclide to determine a difference value therebetween;

calibrating the measured PSF using simulated PSF values to reduce the difference value between the measured PSF and the simulated PSF;
storing the calibrated PSF to memory;
generating a nuclear image of a point source of a radiopharmaceutical sample from acquired nuclear scan data;
comparing a measured PSF from the nuclear image to the calibrated PSF;
adjusting one or more calibration parameters to estimate a level of off-energy contamination in the radiopharmaceutical sample;
employing the adjusted parameters when combining the calibrated PSF and a simulated PSF for the radiopharmaceutical sample;
estimating weighting factors for the PSF; and
at least one of recalibrating the calibrated PSF and calibrating the measured PSF using the weighting factors to generate an adjusted PSF.

6. The method according to claim 5, wherein generating simulated PSFs includes:
simulating one or more PSFs that account for a plurality of variables including at least one of septum penetration, collimator scattering, and k-edge fluorescence in lead (Pb).

7. The method according to claim 5, wherein measuring a PSF for a given radiopharmaceutical includes:
measuring down-scatter images initially, and measuring the down-scatter images again after a predetermined multiple of the half-life of the at least one radiopharmaceutical to detect time-dependent changes in the at least one radiopharmaceutical.

8. The method according to claim 7, further including:
measuring the PSF in list-mode to obtain data independent of special energy-window and resolution settings.

9. The method according to claim 5, wherein the difference value represents a modeling error value that describes error due to high-energy contamination, backscatter, and non-linear camera response.

10. The method according to claim 5, further including:
employing an attenuation shield when measuring the PSF to distinguish between multiple emission energies of the at least one radiopharmaceutical.

11. A non-transitory computer-readable medium having stored thereon software for controlling one or more computers to perform the method according to claim 5.

12. A single photon emission computed tomography (SPECT) nuclear camera including a processor programmed to perform the method of claim 5.

13. A method of re-calibrating calibrated point spread functions (PSF) for a nuclear camera, including:
generating simulated PSFs for all photon energies at all detection distances relative to the surface of the nuclear camera;
measuring a PSF of each of at least one radiopharmaceutical potentially employed by a user;
subtracting a simulated PSF from a corresponding measured PSF for the at least one nuclide to determine a difference value therebetween;
scanning a tracer sample using the nuclear camera;
generating a nuclear image of the tracer sample from acquired nuclear scan data;
comparing a measured PSF from the nuclear image to a calibrated PSF generated by calibrating the measured PSF;
adjusting one or more calibration parameters to estimate a level of contamination in the tracer sample;
employing the adjusted parameters when combining the calibrated PSF and a simulated PSF for the tracer sample;
estimating weighting factors for the PSF; and
recalibrating the calibrated measured PSF using the weighting factors to generate a recalibrated PSF.

14. The method according to claim 13, wherein estimating the weighting factors is performed based on at least one of a mathematical norm of the measured PSF, a mean squared error of the measured PSF, and a central peak magnitude of the measured PSF.

15. The method according to claim 13, further including employing the recalibrated PSF when reconstructing a nuclear image of a subject.

16. A non-transitory computer-readable medium having stored thereon software for controlling one or more computers to perform the method according to claim 13.

17. A single photon emission computed tomography (SPECT) nuclear camera including a processor programmed to perform the method of claim 13.

18. A method of calibrating a point spread function (PSF) for a nuclear camera, including:
pre-calibrating a PSF for a selected isotope;
scanning a point source comprising a sample of the selected isotope to be used as a tracer in a nuclear scan of a subject;
generating a nuclear image of the point source from acquired nuclear scan data;
comparing a measured PSF from the nuclear image to the pre-calibrated PSF;
adapting one or more calibration parameters to estimate a level of off-energy contamination in the radiopharmaceutical sample;
employing the adapted parameters when combining the pre-calibrated PSF and a simulated PSF for the radiopharmaceutical sample;
generating a calibrated PSF for the selected isotope based on a measured PSF for the point source and the pre-calculated PSF for the selected isotope;
estimating weighting factors for the PSF; and
recalibrating the calibrated PSF using the weighting factors to generate a recalibrated PSF.

19. The method according to claim 18, further including:
employing the calibrated PSF during reconstruction of a nuclear image using data acquired during a dual isotope nuclear scan of the subject in which the selected isotope and a second isotope are employed as tracers.

20. The method according to claim 18, further including:
adjusting the calibrated PSF in real time during the scan of the point source.

* * * * *